United States Patent
Woods

(10) Patent No.: US 11,634,672 B2
(45) Date of Patent: Apr. 25, 2023

(54) DISINFECTING SOLUTION WIPES

(71) Applicant: Amy Woods, Reno, NV (US)

(72) Inventor: Amy Woods, Reno, NV (US)

(*) Notice: Subject to any disclaimer, the term of this patent is extended or adjusted under 35 U.S.C. 154(b) by 497 days.

(21) Appl. No.: 17/012,276

(22) Filed: Sep. 4, 2020

(65) Prior Publication Data
US 2021/0348090 A1 Nov. 11, 2021

Related U.S. Application Data

(60) Provisional application No. 63/022,087, filed on May 8, 2020.

(51) Int. Cl.
| | | |
|---|---|---|
| C11D 17/00 | (2006.01) | |
| C11D 17/04 | (2006.01) | |
| C11D 3/48 | (2006.01) | |
| C11D 3/20 | (2006.01) | |
| A01N 37/02 | (2006.01) | |
| C11D 3/382 | (2006.01) | |
| A01N 25/34 | (2006.01) | |
| C11D 3/50 | (2006.01) | |

(52) U.S. Cl.
CPC ............ *C11D 17/049* (2013.01); *A01N 25/34* (2013.01); *A01N 37/02* (2013.01); *C11D 3/2079* (2013.01); *C11D 3/382* (2013.01); *C11D 3/48* (2013.01); *C11D 3/50* (2013.01)

(58) Field of Classification Search
CPC .............................. C11D 17/049; A01N 25/34
See application file for complete search history.

(56) References Cited

U.S. PATENT DOCUMENTS

2006/0112899 A1* 6/2006 Zur ..................... A47L 13/16
119/652
2008/0293613 A1* 11/2008 Johnson ................. A47L 13/17
510/438

OTHER PUBLICATIONS https://auntfannies.com/product/cleaning-vinegar-wipes/.*

* cited by examiner

*Primary Examiner* — Necholus Ogden, Jr.
(74) *Attorney, Agent, or Firm* — Brennan, Manna & Diamond, LLC

(57) ABSTRACT

This present invention relates to a pre-packaged set of disinfecting solution wipes used to prevent urinary tract and other infections, and reduce to bacterial growth. The wet wipes are stored in packages until needed, and are infused with a novel water and vinegar solution. The wipes can be applied multiple times a day to help eliminate odors, soothe skin, and reduce bacteria growth by neutralizing the pH of the user's skin. The wipes may also be used as a temporary bathing solution for those without immediate access to a shower or bathroom. The containers of the present invention are reusable, and feature a sealed lid to prevent the wet wipes from prematurely drying out.

14 Claims, 3 Drawing Sheets

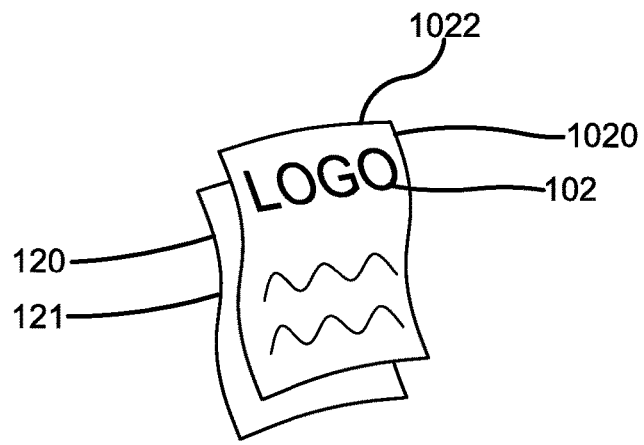
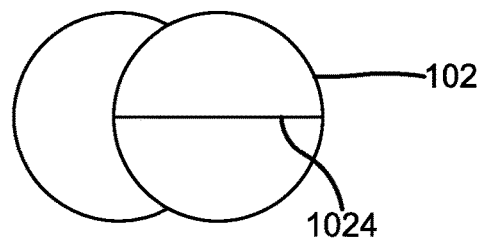
FIG. 3a  FIG. 3b
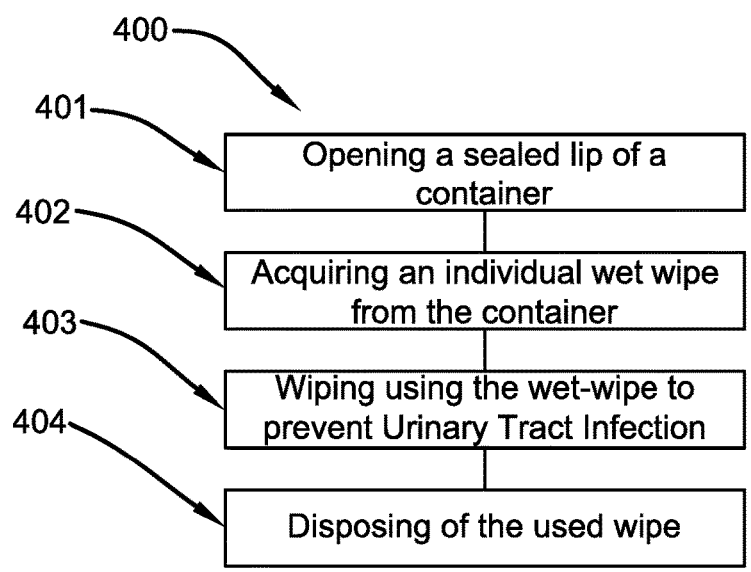
FIG. 4

DISINFECTING SOLUTION WIPES

CROSS-REFERENCE TO RELATED APPLICATION

The present application claims priority to, and the benefit of, U.S. Provisional Application No. 63/022,087, which was filed on May 8, 2020 and is incorporated herein by reference in its entirety.

BACKGROUND

The present invention relates generally to the field of wet or sanitary disinfecting wipes. More specifically, the present invention relates to a pre-packaged set of wet or sanitary wipes used to prevent urinary tract infections (UTI), and to reduce other bacterial growth. The individual wet wipe of the present invention utilizes a special disinfecting solution comprised of water and vinegar that helps to neutralize the pH of the skin, and thereby reduce bacteria growth. The wipe of the present invention can be applied multiple times a day to the perineum and the skin to help eliminate odors, soothe the skin, and reduce bacteria growth, and also functions as an effective cleaning tool for a user without immediate access to a bath, bidet or shower. The wet wipes are stored in packages or containers of various sizes until needed, and are infused with the unique water and vinegar solution. The containers are reusable and feature a sealed and resealable lid to prevent the wipes from drying out prior to usage. Accordingly, this disclosure makes specific reference thereto. Nonetheless, it is to be appreciated that aspects of the present invention are also equally applicable to other like applications, devices and methods of manufacture.

By way of background, pathogenic bacteria such as *Shigella, Campylobacter, Staphylococcus*, and particularly *Streptococcus, Escherichia, Salmonella*, and *Escherichia* can colonize on skin or other epithelial tissue. Pathogenic bacteria can also result in any of a variety of infections such as dermatitis, diaper rash, and impetigo, commonly caused by bacteria such as *Escherichia coli*, and *Staphylococcus aureus*, to which elderly, infants and pre-school children are particularly susceptible.

Other pathogenic conditions include urinary tract infections commonly suffered by females. For example, *E. coli* can be pathogenic, and is also responsible for various types of infections in humans, such as urinary tract infections. *E. coli* can colonize from the feces or perineal region if not properly and routinely cleaned, and ascend the urinary tract to the bladder, thereby causing infection and irritation. Likewise, *P. aeruginosa* is resistant to many antibiotics, and may infect almost any type of compromised tissue, and can cause a variety of infections, including urinary tract infections.

Stated differently, urinary tract infections are caused by bacteria, which may enter the bladder by traveling up the individual's urethra. In general, the urethra is somewhat naturally protected by its structure, but if the opening of the urethra (or the vulva in girls) becomes irritated, bacteria can grow there. Further, delaying going to the bathroom makes it more likely that an individual will contract a urinary tract infection, and sexual intercourse or careless wiping after a bowel movement might also cause irritation and potentially infection.

Urinary tract infections may also reoccur if not properly and thoroughly treated and if proper precautions are not taken. Additionally, other infections can also occur due to poor hygiene, bacterial growth, and the use of an inadequate cleaning solution. For example, urinary tract infections and wound re-infections can occur from yeast overgrowth caused by poor hygiene methods. Generally, individuals need immediate and periodic access to a shower or other cleansing opportunities to maintain hygiene, which is time consuming, not always possible and tiring for the individual, especially when the individual is not at home. Further, to date, existing skin cleaning products, such as wet wipes and dry wipes, have primarily cleaned the surface of the skin, but have not yet proven to be particularly effective against potentially harmful pathogens. Also, currently used antibacterial agents such as isopropyl alcohol, various surfactants and other antibacterial agents, are unacceptably harsh, drying and/or irritating to the skin and mucous membranes. Other antibacterial agents may be insufficiently effective at lower levels of concentration that are deemed safer for use with skin, and tend to leave a residue.

Therefore, there exists a long felt need in the art for a sanitary and disinfecting wet wipe product that can be used as a temporary bathing or cleaning method for people without immediate access to a shower or other facility to cleanse oneself. There is also a long felt need in the art for a disinfecting solution wipe for reducing bacterial growth and urinary tract infection risk. Additionally, there is a long felt need in the art for a disinfecting solution wipe that can be applied multiple times a day to the perineum and skin to help eliminate odors, soothe skin, and reduce bacteria growth by neutralizing the pH of the skin without causing undue irritation. Moreover, there is a long felt need in the art for a disinfecting solution wipe which provides immediate disinfection, and eliminates the need for repeated showering in order to prevent infections and illnesses. Further, there is a long felt need in the art for a wet wipe product that utilizes a special disinfecting solution that is capable of preventing urinary tract infections and that does not cause undue irritation to the user's skin. Finally, there is a long felt need in the art for a sanitary wet wipe that may be stored in, and dispensed from, containers of various sizes without prematurely drying out, and that is infused with a unique water and mild vinegar solution.

The subject matter disclosed and claimed herein, in one embodiment thereof, comprises a supply of disinfecting solution wipes stacked in a container for ease of removal, or a dispenser having a top surface, an enclosure on the top surface having a cover member that can be opened to create a dispensing opening for individual removal of the wet wipe, wherein the individual wet wipes are infused with a unique water and vinegar solution that reduces the potential for bacteria growth by neutralizing the pH of the user's skin. The invention also offers a novel and effective sanitary wet wipe composition that prevents urinary tract infections, and reduces bacteria growth.

The disinfecting solution of the present invention provides a sanitizing composition which may be comprised essentially of natural ingredients. The essential components of the disinfecting solution are water and vinegar. More specifically, distilled white vinegar generally contains between 4-7% acetic acid, and 93-96% water by weight. However, some types of white vinegar can contain up to 20% acetic acid. Urinary tract infections tend to grow and exist in non-acidic environments. Vinegars, such as white vinegar, rice vinegar, or apple cider vinegar marketed under the BRAGG® brand, and acidic which helps to balance pH levels and prevent urinary tract infections. The concentration of vinegar in the wet wipe of the present invention is such that it does not cause irritation to the skin.

Research has also shown that the acetic acid in vinegar can reduce the growth of *E. coli*, *S. aureus* (aka staph), and *C. albican* (*Candida*). Bacteria do not thrive in an acidic environment, and vinegar could help prevent bacteria growth, thus preventing urinary tract and other types of infections. Thus, the disinfecting solution used with the sanitary wipes of the present invention preferably range from 4 to 20% acetic acid in solution, by weight.

In this manner, the novel disinfecting solution wipe of the present invention accomplishes all of the forgoing objectives, and provides a relatively safe, easy, convenient and cost-effective solution to using a wipe to cleanse oneself and prevent urinary tract and other types of infections. The disinfecting solution wipes of the present invention are also user friendly, inasmuch as they are less expensive than their alternatives, and do not require the user to put much effort or labor into eliminating odors, soothing the skin, and reducing bacteria growth without causing significant irritation to the skin.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

As used herein, the term "wet wipe" or "sanitary wet wipe" refers to a fibrous, paper, woven or non-woven, cloth sheet that has the unique solution of water and vinegar, such as apple cider vinegar or distilled white vinegar, applied to the entire roll or stack of sanitary wipes during manufacture or prior to dispensing. The amount of solution contained within each sanitary wet wipe can vary depending upon the type of material being used to provide the wet wipe, the type of container being used to store the wet wipes, and the desired end use of the wet wipe. In addition, the user may prefer a solution which is organically sourced, or environmentally sustainable. Generally speaking, it is anticipated that for most applications and wipe substrate used, each wet wipe can contain from about 25 to about 500 percent of the disinfecting solution or, more preferably, from about 200 to about 500 weight percent of the disinfecting solution, based on the dry weight of the wipe. In a further preferred embodiment of the present invention, the disinfecting solution may also comprise a fragrance, scent, cleaning agent, sanitizing agent, and/or an emollient, such as an aloe, lanolin or other soothing solution.

The subject matter disclosed and claimed herein, in one embodiment thereof, comprises a unique disinfecting solution for use with a sanitary wet wipe product which is stacked, interfolded or integrally interconnected in a container or a dispenser having a top surface, an enclosure on the top surface having a sealed lid that can be opened to create an opening for individual removal of the wet wipe. The individual wet wipes are infused with a water and vinegar solution that reduces bacteria growth by neutralizing the pH of the user's skin. The invention offers a novel and effective sanitary wet wipe composition that prevents urinary tract and other infections, and reduces the potential for bacteria growth. Further, the container is reusable and features a resealable lid to prevent the wipes from drying out.

In a further embodiment of the present invention, a preservative solution for impregnating a wet wipe product to prevent urinary tract and other infections is disclosed and comprises water and white or apple cider vinegar. As previously stated, unitary tract infections grow and exist in non-acidic environments. Vinegar, such as white and apple cider vinegar, is acidic, which helps balance pH levels and prevent urinary tract infections. Nonetheless, the concentration of vinegar in the wet wipe of the present invention is such that it does not cause undue irritation to the skin. The pH of the preservative solution in which the sanitary wet wipes are infused is preferably below about 3-5 pH. Such a low pH is relatively non-irritating to the skin, and helps in balancing the pH levels of the user and to prevent urinary tract and other types of infections from occurring. In another embodiment, the effective aqueous solution of the present invention has a pH of about 6.

In a further embodiment of the present invention, a sanitary wet wipe product specifically used for reducing bacterial growth and urinary tract infection risk is disclosed and comprises a fibrous and porous sheet, wherein the sheet is infused with an aqueous solution comprising vinegar, water and a fragrance. The pH of the solution in which the sanitary wet wipe is infused is preferably below a pH level of 3.5-5. Such a low pH is relatively non-irritating to the user's skin, and helps in balancing the pH levels of the user's skin and to prevent urinary tract and other similar infections.

In a further embodiment of the present invention, a method for producing a wet wipe product for reducing bacterial growth and urinary tract infection risk is disclosed and the method comprises forming a fibrous and porous wipe, and then preparing an aqueous solution. Next, a vinegar solution is added to the aqueous solution and the individual wipes are infused with the solution, and then packaged in a stacked or rolled manner in a container or a dispenser for single use or dispensing.

In yet another embodiment of the present invention, a method of using a wet wipe of the present invention is disclosed to wipe bacteria and other excrement away from the urinary area and towards the rectum to prevent the possibility of a urinary tract infection and, in a similar way, to wipe over a wound to prevent infection or contamination. The steps of the method comprise initially acquiring a wet wipe impregnated with the unique solution of the present invention from a plurality of stacked wipes disposed within a container having an opening with a sealed lid, thereby creating a dispensing opening. The unique solution is preferably comprised of water, white or apple cider vinegar, and a fragrance, but may also include a cleaning agent, sanitizing agent, and/or an emollient. More specifically, each wet wipe can contain from about 25 to about 500 percent of the disinfecting solution, based on the dry weight of the wipe, wherein the pH of the solution is preferably below 3.5-5. Next, an individual wet wipe is removed from the container opening, and the desired portion of the body and skin is wiped to reduce bacterial growth and urinary tract infection risk.

In a still further embodiment of the presently described invention, an alcohol free sanitary wipe is described and includes a non-woven material, wherein the non-woven material is provided in substantially equal lengths to form individual wipes. Each of the individual wipes is substantially equal in both length and width. An alcohol free solution including at least water and vinegar is used to infuse the individual wipes, and the amount of weight of the solution used for each wipe is approximately 70 to about 500 percent of the dry weight of the individual wipe.

In yet a further embodiment of the presently described invention, a combination dispensing container and sanitary wipe supply is described and includes a dispensing container having an interior area and an opening covered by a movable closure. A supply of material is provided with, wherein the supply of material is divided into a number of equal sized sanitary wipes, with each of the wipes being separable from one another. Each of the wipes is infused with a novel disinfecting solution, and is removable from the dispensing container through the opening. The novel disinfecting solution is comprised of a combination of water and vinegar, wherein the vinegar has a percentage of acetic acid of not more than 20 percent by weight of the vinegar in the solution.

In yet still a further embodiment of the presently described invention, a method of using a combination dispensing container and sanitary wipe supply is described. The method comprises the steps of initially providing a container that has an enclosed area and an opening covered by a movable closure. Next, a sanitary wipe supply is inserted into the container and the supply is infused with the novel sanitary solution of the present invention. More specifically, the sanitary solution is alcohol free and is comprised of both water and vinegar. The sanitary wipe supply is separated into individual wipes. Next, the movable closure is opened so that at least one of the individual wipes is removed from the container. Then the container is resealed by closing the movable closure, and the removed individual wipe is used.

The wipes of the present invention are particularly advantageous because the wipes can be used and applied multiple times a day to the perineum and skin to help eliminate odors, soothe skin, and reduce the potential for bacteria growth by neutralizing the pH of the user's skin. The wipes of the present invention also function as a cleaning tool for individuals without immediate access to a shower, do not irritate the skin, and resemble and function similar to conventional wipes, albeit without the benefits of the unique disinfecting solution.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which:

FIG. 3a illustrates a perspective view of one potential embodiment of an individual wet wipe impregnated with the disinfecting solution of the present invention in accordance with the disclosed structure;

FIG. 3b illustrates a perspective view of one potential embodiment of an individual wet wipe impregnated with the disinfecting solution of the present invention in accordance with the disclosed architecture;

FIG. 4 illustrates a diagrammatic representation of one potential embodiment of a method of using the disinfecting solution wipe of the present invention in accordance with the disclosed architecture;

DETAILED DESCRIPTION

Figure 1A:
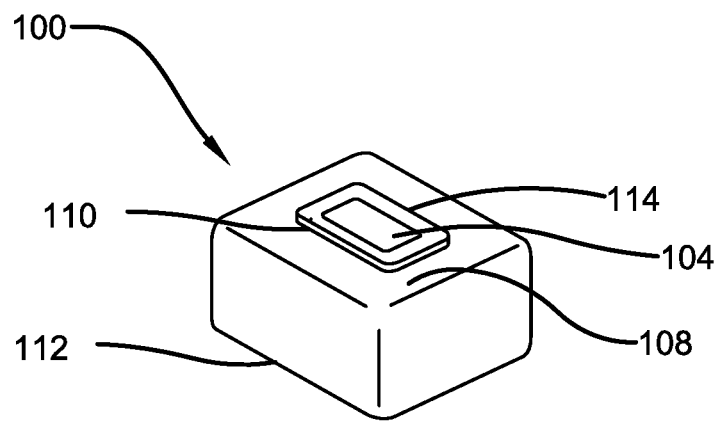
FIG. 1a illustrates a perspective view of one potential embodiment of a container of the disinfecting solution wipes of the present invention in accordance with the disclosed architecture and in a closed condition.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a sanitary and disinfecting wet wipe that can be used as a temporary bathing or cleaning method for people without immediate access to a shower or other facility to cleanse themselves, and for reducing bacterial growth and the risk of urinary tract and other types of infection. Additionally, there is a long felt need in the art for a disinfecting solution wipe that can be used to help eliminate odors, soothe skin, and reduce bacteria growth by neutralizing the pH of the user's skin without irritating the same. Moreover, there is a long felt need in the art for a disinfecting solution wipe impregnated with a special disinfecting solution comprised of water, vinegar and a fragrance. Finally, there is a long felt need in the art for a sanitary wet wipe that may be stored in, and dispensed from, containers of various sizes without prematurely drying out, and that is infused with a unique water and mild vinegar solution.

The present invention, in one exemplary embodiment, is a novel disinfecting solution for use with a sanitary wet wipe. More specifically, the individual wet wipes are infused with a solution of water and vinegar that reduces the potential for bacteria growth by neutralizing the pH of the user's skin. The solution may further comprise a fragrance or other essential oils which may aid in calming the irritated skin. The infused or impregnated wipes may be stacked in an interfolded or z-folded manner, or integrally interconnected in a continuous roll, and dispensed from a container or dispenser having a top surface, an enclosure on the top surface having a sealed lid that can be opened to create an opening for individual removal of the individual wet wipes. Further, the container is reusable and features a sealed lid to prevent the wipes from prematurely drying out before use. The invention offers a novel and effective wet wipe composition that helps to prevent urinary tract and other infections, as well as aiding in the reduction or prevention of bacteria growth.

Figure 1B:
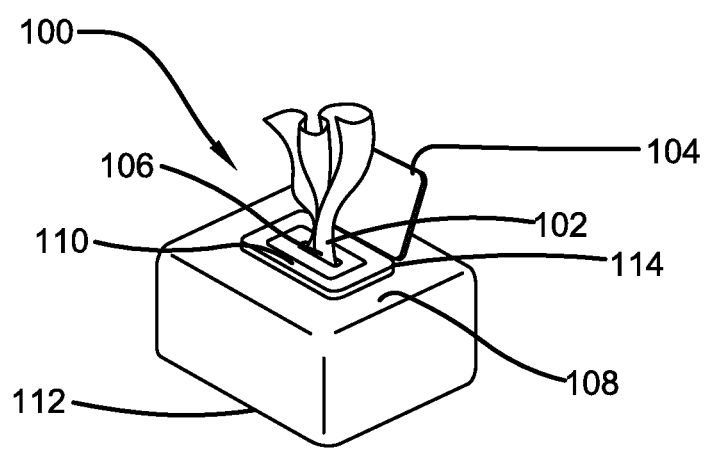
FIG. 1b illustrates a perspective view of the container of the disinfecting solution wipes of FIG. 1a in an open condition, and with at least one wipe extending outwardly therefrom.

Referring initially to the drawings, FIG. 1a illustrates a perspective view of one potential embodiment of a container 100 of the disinfecting solution wipes 102 of the present invention in a closed condition, and FIG. 1b illustrates a perspective view of the container 100 of the disinfecting solution wipes in an open condition, and with at least one wipe 102 extending outwardly therefrom. In this particular embodiment, the container 100 is a generally cuboidal shaped box that has a body generally made up of durable and flexible plastic-based packaging material, such as poly bags and the like. The packaging may also be made from a paperboard material with a wax or poly coating to help keep the wet wipes 102 contained therein moist until needed. The packaging material for the container 100 forms a complete package for the wet wipes 102 infused with a novel aqueous solution, as described more fully below.

The container 100 has a top surface 108, a bottom surface 112 on which the container rests on a surface, and an enclosure 110 having a sealed lid 104 which is pivotally hinged on an edge 114. The sealed lid 104 is at least sufficiently sealed to prevent spoilage or drying out of the wet wipes 102 stored within the container 100. The wet wipes 102 may be stacked, interfolded, z-folded or integrally interconnected within the container 100, such that they may be dispensed one at a time. As best shown in FIG. 1b, once the sealed lid 104 is opened along the hinged edge 114, a dispensing opening 106 is created through which a user can take out an individual wipe 102 from the stacked wipes container 100. The wet wipes 102 are retained in position thereby, when the lid 104 is closed. In an additional embodiment, the sealed lid 104 may have a locking tab or other fastening mechanism (e.g. adhesive closure, hook and loop closure, male and female tabs or the like) to lock or securely close the lid 104 to the enclosure 110.

The lid 104 may be permanently or removably attached to the enclosure 110 of the container 100, which allows the container 100 to be refilled with wipes 102, thereby making it reusable and extending its useful life. There are many alternative means for attaching the lid 104 to the enclosure 110. For example, the lid 104 may be manufactured with one or more ridges that can be snap-fitted into the receiving grooves in the enclosure 110. Alternatively, the lid 104 may be designed so that it can be friction-fitted to the enclosure 110, or may have a channel and rail type closure.

The container 100 may be of any suitable shape and size, including but not limited to, rectangular, cubic, pyramidal, cylindrical, spherical, or any other shape that allows a stack or roll of wet wipes 102 to be stored therein until needed. In addition, the container 100 may take on a promotional shape to coincide with a marketing or entertainment event. Although the container 100 is generally made of plastic material such as polyethylene, in other embodiments, the container 100 may be made of any other suitable material, such as cellulosic, cotton fibers, recycled natural fibers or fabric products. Suitable materials may include flexible materials. The containers shown in the figures and described the embodiments are not limited to any particular size or shape.

Figure 2:
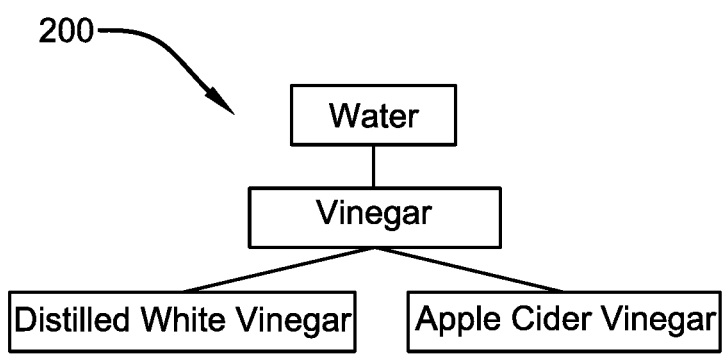
FIG. 2 illustrates a diagrammatic representation of one possible combination of the ingredients of the novel disinfecting solution for use with the disinfecting solution wipes of the present invention in accordance with the disclosed architecture.

FIG. 2 illustrates a diagrammatic representation of one possible combination of the ingredients of the novel disinfecting solution 200 for use with the disinfecting solution wipes 102 of the present invention in accordance with the disclosed architecture. More specifically, each of the wipes 102 is infused or impregnated with the disinfecting solution 200 that relies primarily on a mixture of water and vinegar to help prevent urinary tract and other types of infections. By way of background and as mentioned above, vinegar contains acetic acid that is useful for balancing or neutralizing the pH of the user's skin. In one embodiment, the vinegar may be a distilled white vinegar having a pH of approximately 2.5, or an apple cider vinegar having a pH of approximately 2.3. Nonetheless, in alternate embodiments, the vinegar used for the solution 200 may be a wine vinegar, a cane vinegar, a fruit vinegar (e.g. apple, etc.), a palm vinegar, a balsamic vinegar or a grain vinegar. Further, an amount of water can be added to dilute the vinegar and maintain a balanced or desired pH level.

The preferred composition of the solution 200 is comprised of about 88% water and about 12% vinegar, by weight. In an alternate embodiment, the solution 200 is comprised of about 60-75% water and about 15-35% vinegar, by weight. In a further alternate embodiment, the solution 200 is comprised of about 90-98% distilled water and about 5-10% vinegar, by weight. Alternatively, the vinegar used in the solution 200 may have a composition of 1:1 distilled white vinegar and apple cider vinegar along with water in any of the above percentages. As a further alternative, the vinegar used in the solution 200 may have a composition of 1:2 distilled white vinegar and apple cider vinegar along with water.

The acetic acid in the vinegar reduces the growth of *E. coli, S. aureus* (aka staph), *C. albican* (*Candida*) and other bacteria which result in approximately 90% of urinary tract infections. More specifically, bacteria do not tend to thrive in an acidic environment, and the vinegar inclusive aqueous solution 200 of the present invention helps prevent bacteria, mold, and/or yeast growth. Other optional ingredients may be added such as a fragrance, essential oils (e.g., oils extracted from plants), or nature oils to help soothe or calm the region being treated. The solution 200 of the present invention is also alcohol free so as not to dry or irritate the skin. In alternate embodiment, the solution 200 may additionally comprise an emollient. Emollients hydrate and protect the user's skin from irritation as the emollient is deposited onto the skin and remains at its surface as a thin protective layer, and provides a desired sensory feel to the skin.

As previously stated, the solution 200 is incorporated into the individual wipes 102 as an aqueous liquid. The amount or weight of the solution 200 that is added to and retained by each wipe 102 can be from about 70 to about 700 percent of the dry weight of the wipe, and more specifically from about 200 to about 500 percent, and still more specifically from about 200 to about 400 percent.

FIGS. 3a and 3b illustrate perspective views of potential embodiments of individual wet wipes 102 impregnated with the disinfecting solution 200 of the present invention in accordance with the disclosed structure. More specifically, as shown in FIG. 3a, each wet wipe 102 is generally rectangular or square in shape, and may have any desired unfolded width and length. For example, the wet wipe 102 may have an unfolded length 1020 of from about two inches to about nine inches, and an unfolded width 1022 of from about two inches to about six inches. The wipes 102 may further comprise logos 120, indicia, trademarks, geometric patterns, customizable colors and fonts, embroidery and prints and/or other images on their surface.

Alternatively, as best shown in FIG. 3b, each wet wipe 102 may be generally circular or oval in shape, and may have any desired unfolded diameter 1024. For example, the circular wet wipe 102 may have an unfolded diameter 1024 of from about two inches to about six inches. Alternatively, the wet wipes 102 may include a continuous strip of material which has perforations between each wipe 102, and which may be arranged in a stack or rolled into a roll for easy dispensing. Nonetheless, the shape and dimensions of the wet wipe 102 are not so limited, and can be of any shape, size or configuration that is suitable to the needs of the user.

The wipes 102 are preferably made from a non-woven fabric and more preferably from a polyester material, such as polyethylene, PET or polypropylene. In addition to the polyester or polypropylene materials referenced above, each individual wet wipe 102 may be made from a variety of materials including coform materials, air-laid materials, hydroentangled materials, spunbond materials, meltblown materials, and the like. The wipe 102 has fibrous materials which provide an improved appearance and feel to the wet wipe 102. Natural fibers, such as cellulosic fibers are preferably used in the present invention. Nonetheless, thermoplastic polymeric fibers, such as polyolefins may also be used in the present invention. Alternatively, synthetic fibers, such as staple nylon and rayon fibers may also be used to construct the wipes 102.

FIG. 4 illustrates a diagrammatic representation of one potential embodiment of a method 400 of using the disinfecting solution wipes 102 of the present invention in accordance with the disclosed architecture. More specifically, the method 400 includes an initial step 401 of opening a sealed lid 104 of the container 100 to obtain a wipe 102. At step 402, the user acquires an individual wet wipe 102 from an opening 106 of a container 100 containing a stack of wet wipes, wherein the wipe 102 is infused with a novel water and vinegar solution 200 as described herein. At step 403, the removed wipe 102 may be used to wipe the urinary area of a user in the direction of the rectum to avoid spreading bacteria from the rectal area to the urethra. Lastly, at step 404, the used wipe 102 is properly disposed of.

Figure 5:
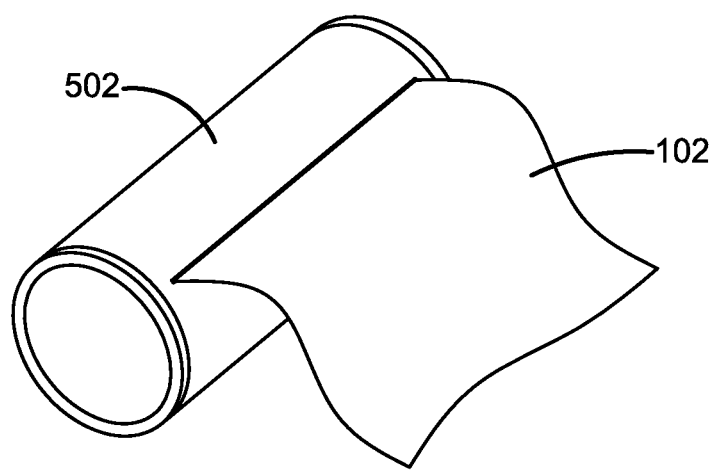
FIG. 5 illustrates a perspective view of one potential embodiment of a wall mounted dispensing mechanism for dispensing a roll of the disinfecting solution wipes of the present invention in accordance with the disclosed architecture.

FIG. 5 illustrates a perspective view of one potential embodiment of a wall mounted dispensing mechanism 502 for dispensing a roll of the disinfecting solution wipes 102 of the present invention in accordance with the disclosed architecture, wherein the wet wipes 102 are infused with the water and vinegar solution 200 of the present invention. More specifically, the dispenser 502 may be generally cylindrical in shape and have a mounting plate (not shown) for mounting the dispenser 502 to a wall by mechanical fastening means, such as screws, bolts, pins, tabs and/or grooves. The dispenser 502 houses the wipes 102 until needed, and prevents the same from prematurely drying out. The wipes 102 themselves may be comprised of a woven or nonwoven material as elsewhere described herein, and the first wipe 102 from the roll of wet wipes located in the dispenser 502 may be pulled from outside of the roll. Stated differently, the roll of wipes 102 may unwind from the outside of the roll to the inside of the roll. The roll of wipes 102 may unwind in either a clockwise or counterclockwise manner.

Figure 6:
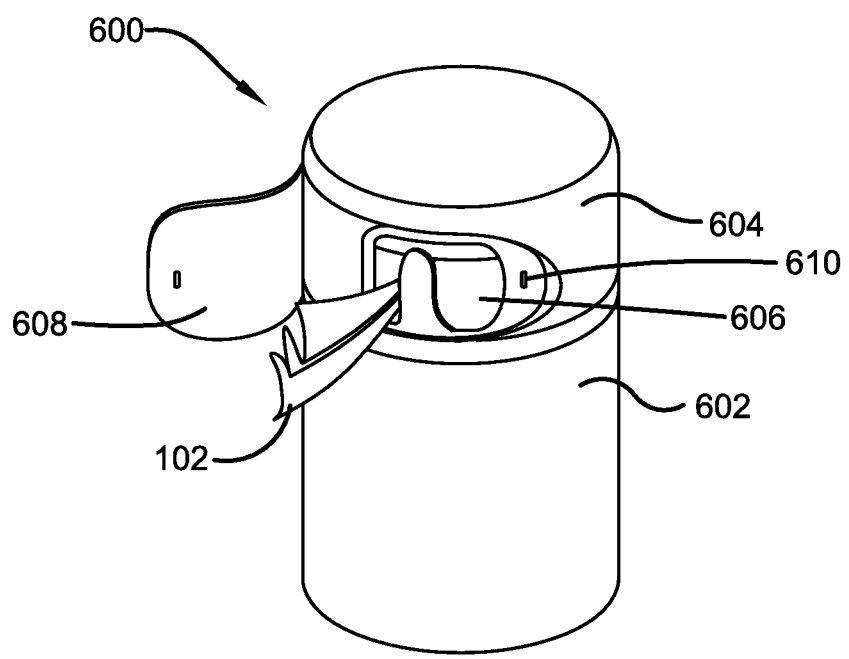
FIG. 6 illustrates a perspective view of one potential embodiment of an upright and cylindrical container for storing the disinfecting solution wipes of the present invention in accordance with the disclosed architecture.

FIG. 6 illustrates a perspective view of one potential embodiment of an upright and cylindrical container 600 for storing the disinfecting solution wipes 102 of the present invention in accordance with the disclosed architecture. More specifically, container 600 may be an upright container for storing the wet wipes 102 in a rolled manner, wherein the wipes 102 have been infused or impregnated with a novel disinfecting solution 200 comprised of both water and vinegar as explained elsewhere herein. A dispensing opening 606 is created by opening the lip/flap 608, which is secured to the container 600 through a fastening means 610, such as a button, hinge, Velcro®, adhesive closures and the like, on the top portion 604 of the container 600. Once the lip 608 is opened, an individual wet wipe 102 may be removed for use. The top portion 604 may also be removed to replenish the container 600 with a new supply of wet wipes 102, thereby making the container 600 reusable and lessening the waste stream.

The wet wipes 102 may be made available in different sizes and colors to accommodate user need and/or preference, and the exact size, measurement, construction and design specifications of the unique wipe 102 of the present invention may vary upon manufacturing or the particular material that is used. The surface of the wipe 102 is preferably flat, but may optionally contain raised and/or lowered portions creating patterns, such as an undulating pattern 122 which may help aid in a cleaning process. As previously stated, the wipes 102 may further comprise logos, indicia, trademarks, geometric patterns, customizable colors and fonts, embroidery and prints and/or images 120 on its surface. Further, the wet wipes 102 may be scented to have different fragrance as per the requirements of different users.

As previously stated, the wet wipes 102 are preferably arranged in the dispensers described above, or any other dispenser and in any other manner which provides easy and reliable one at a time dispensing and that prevents the wipes 102 from becoming dirty, contaminated and/or dry. As an example, the wipes 102 can be arranged in the container as a plurality of individual wipes arranged in a stacked configuration to provide a stack of wipes which may or may not be individually folded. Alternatively, the wipes may be individual wipes which are folded in a c-fold, z-fold, quarter fold or other zigzag fold, interfolded or non-interfolded configurations as are known to those skilled in the art. The plurality of wipes 102 may also be stacked one on top of each other in a non-interfolded configuration, for "reach-in" dispensing. For a non-interfolded wipe configuration, each wipe is folded onto itself with no portion of another adjacent wipe being positioned between or underneath any portion of the folds of the adjacent wipe(s).

The container as per the present invention can include any suitable number of individual wipes depending upon the desired packaging and end use. For example, the container can be configured to include a stack and/or roll of wipes which can include at least about 20 wipes and desirably from about 15 to about 320 individual wipes, and more desirably from about 20 to about 80 wipes. The size and shape of the container is dependent upon the size and shape of the stack of wipes and vice versa. The container used to house the wet wipes 102 of the present invention may include, but are not limited to, flow wrap pouches, individual sachets, chained sachets comprising a tear line between each sachet, and other forms known in the art as suitable for storing nonwoven articles.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "solution wipes", "solution wet wipes", "disinfecting wipes", "wet wipes", and "wet wipes with container" are interchangeable and refer to the portable wet wipes 102 with a container product 100 of the present invention.

Notwithstanding the forgoing, the wet wipes 102 and container 100 of the present invention can be of any suitable size and configuration as is known in the art without affecting the overall concept of the invention, provided that it accomplishes the above stated objectives. One of ordinary skill in the art will appreciate that the size, configuration and material of the wet wipes 102 within container 100 as shown in the FIGS. are for illustrative purposes only, and that many other sizes and shapes of the wet wipes 102 within container 100 are well within the scope of the present disclosure. Although the dimensions of the wet wipes 102 and the container 100 are important design parameters for user convenience, the wet wipes 102 and the container 100 may be of any size that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An alcohol free supply of wipes comprising:
   a polyester or a polypropylene non-woven material comprised of a plurality of individual wipes, wherein each of the plurality of individual wipes are equal in length and width;
   an alcohol free solution comprising 60-75% of water and 15-35% of vinegar, wherein each of the plurality of individual wipes is infused with the alcohol free solution, and further wherein the alcohol free solution contained in each of the plurality of individual wipes is between 70 and 700 percent of a dry weight of each of the plurality of individual wipes; wherein the vinegar is selected from the group consisting of a cane vinegar, a fruit vinegar, a rice vinegar, a palm vinegar, a balsamic vinegar and a grain vinegar and wherein the alcohol free solution comprises at least one of a fragrance, an emollient and an essential oil.

2. The alcohol free supply of wipes of claim 1, wherein the emollient is selected from an aloe or a lanolin.

3. The alcohol free supply of wipes of claim 1, wherein the alcohol free solution contained in each of the plurality of individual wipes is between 70 and 500 percent of the dry weight of each of the plurality of individual wipes.

4. The alcohol free supply of wipes of claim 1, wherein the non-woven material is made from one of a cellulosic fiber, a cotton fiber, or a recycled natural fiber.

5. The alcohol free supply of wipes of claim 1, wherein the non-woven material is provided in a dispensing container.

6. The alcohol free supply of wipes of claim 1, wherein the non-woven material is provided with at least one of a logo, an indicia, a trademark, a geometric pattern, a color, a font, an embroidery, a print or an image.

7. The alcohol free supply of wipes of claim 1, wherein the water is a distilled water.

8. The alcohol free supply of wipes of claim 1, wherein the non-woven material is provided with an undulating pattern to aid in a cleaning process.

9. A combination dispensing container and sanitary wipe supply comprising:
   a dispensing container having an interior area and an opening with the opening covered by a movable closure;
   a supply of polyester or a polypropylene nonwoven material, the supply of material divided into a number of equal sized sanitary wipes, with each of the sanitary wipes being separable from one another;
   an alcohol free solution comprising 60-75% water and 15-35% vinegar, wherein the vinegar has a percentage of acetic acid of not more than 20 percent by weight of the vinegar in the disinfecting solution;
   each of the wipes is infused with the disinfecting solution and removable from the dispensing container through the opening; wherein the vinegar is selected from the group consisting of a cane vinegar, a fruit vinegar, a rice vinegar, a palm vinegar, a balsamic vinegar and a grain vinegar; wherein the alcohol free solution comprises at least one of a fragrance, an emollient and an essential oil and said alcohol free solution contained in each sanitary wipe is between 70 and 700 percent of a dry weight of each of the sanitary wipes.

10. The combination dispensing container and sanitary wipe supply of claim 9, wherein the water is a distilled water.

11. The combination dispensing container and sanitary wipe supply of claim 9, wherein the movable closure is selected from a group including a locking tab, a mechanical fastening mechanism, an adhesive closure, a hook and loop closure, a set of male and female tabs, or a rail and channel type closure.

12. The combination dispensing container and sanitary wipe supply of claim 9, wherein the vinegar is a distilled white vinegar containing between 4-7% of an acetic acid and 93-96% of a water by weight.

13. The combination dispensing container and sanitary wipe supply of claim 9, wherein the emollient is selected from an aloe or a lanolin.

14. A method of using a combination dispensing container and polyester or polypropylene nonwoven a sanitary wipe supply comprising the steps of:
   providing a container having an enclosed area and an opening, wherein the opening is covered by a movable closure;
   infusing the sanitary wipe supply with an alcohol free sanitary solution, wherein the solution is comprised of 60-75% water and 15-35% vinegar;

inserting a sanitary wipe supply into the container, wherein the sanitary wipe supply is separable into a plurality of individual wipes of equal width and equal length;

opening the movable closure;

removing at least one of the plurality of individual wipes from the container;

resealing the container by closing the movable closure;

using the at least one of the plurality of individual wipes;
  wherein the vinegar is selected from the group consisting of a cane vinegar, a fruit vinegar, a rice vinegar, a palm vinegar, a balsamic vinegar and a grain vinegar;
  wherein the alcohol free solution comprises at least one of a fragrance, an emollient and an essential oil and said alcohol free solution contained in each individual wipe is between 70 and 700 percent of a dry weight of each of the individual sanity wipes.

* * * * *